(12) United States Patent
Chang et al.

(10) Patent No.: US 8,539,131 B2
(45) Date of Patent: Sep. 17, 2013

(54) ROOT HUB VIRTUAL TRANSACTION TRANSLATOR

(75) Inventors: Nai-Chih Chang, Chandler, AZ (US); Jennifer C. Wang, Tempe, AZ (US); Alejandro Lenero Beracoechea, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 343 days.

(21) Appl. No.: 12/888,807

(22) Filed: Sep. 23, 2010

(65) Prior Publication Data

US 2012/0079145 A1    Mar. 29, 2012

(51) Int. Cl.
*G06F 13/14*    (2006.01)

(52) U.S. Cl.
USPC ............................ 710/305; 710/306; 710/240

(58) Field of Classification Search
USPC .................. 710/305–306, 240–244
See application file for complete search history.

(56) References Cited

U.S. PATENT DOCUMENTS

| | | | |
|---|---|---|---|
| 2006/0064521 A1 | 3/2006 | Lin | |
| 2009/0100209 A1* | 4/2009 | Szabelski | 710/313 |
| 2009/0100275 A1 | 4/2009 | Chang et al. | |
| 2009/0172214 A1* | 7/2009 | McGowan | 710/29 |
| 2011/0022769 A1* | 1/2011 | Hung et al. | 710/313 |

FOREIGN PATENT DOCUMENTS

| | | |
|---|---|---|
| WO | 2012040069 A2 | 3/2012 |
| WO | 2012040069 A3 | 6/2012 |

OTHER PUBLICATIONS

Chang, Nai-Chin N., et al., "Root Hub Virtual Transaction Translator", International Search Report and Written Opinion Received for PCT Application Serial No. PCT/US2011/052049, mailed Apr. 17, 2012, 11 pages.

* cited by examiner

*Primary Examiner* — Brian Misiura
*Assistant Examiner* — Kim Huynh
(74) *Attorney, Agent, or Firm* — Jordan IP Law, LLC

(57) ABSTRACT

Systems and methods of operating root hub host controllers provide for determining, at a protocol engine having a dedicated port, a speed of a device in response to a coupling of the device to the dedicated port. Data transfer can occur at a second speed between software interface logic of the host controller and the protocol engine, and at the first speed between the protocol engine and the device via the dedicated port, wherein the second speed is greater than the first speed. In addition, data may be transferred in unicast transactions in which no split tokens are exchanged.

18 Claims, 3 Drawing Sheets

ROOT HUB VIRTUAL TRANSACTION TRANSLATOR

BACKGROUND

1. Technical Field

Embodiments generally relate to root hub controllers. More particularly, embodiments relate to root hub controllers having virtual transaction translators.

2. Discussion

Root hub host controllers such as USB (Universal Serial Bus, e.g., USB Specification, Rev. 2.0, Apr. 27, 2000, USB 3.0 Specification, Rev. 1.0, Nov. 12, 2008, etc.) controllers can be used to connect computing systems to a wide variety of devices such as digital cameras, keyboards and mice. Indeed, a typical computing system might include multiple integrated USB ports, which can enable devices to communicate with the computing system through the root hub host controller. Certain devices, however, may have a maximum operating speed (e.g., processing frequency/rate) that is significantly less than the operating speed of the host controller. To limit the host controller's communication speed to that of the connected device could have a significantly negative impact on performance. Accordingly, the host controller may be equipped with an integrated transaction translator (TT) component that communicates through the software interface of the controller at relatively fast speeds and through the USB ports of the controller at slower speeds if the device(s) attached to those ports are slower devices.

In order to facilitate the translation capability, the software interface of the host controller may issue "split" tokens to the TT component. For example, when an OUT transaction is sent to an FS (full speed, 12 MHz) or LS (low speed, 1.5 MHz) device, the host controller driver and hardware may generate a Start Split (SSplit) token, an OUT token and data, and broadcast this information to all of the downstream ports via the TT component. Later, the host controller can issue a Completion Split (CSplit) token to the TT component, which may return an acknowledgement if the target device has acknowledged successful receipt of all data. The generation of the split tokens can consume bandwidth and power, and may require extra chip real estate. Moreover, the broadcasting of split token transactions to all downstream ports can limit the computing system's ability to communicate with multiple USB devices.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
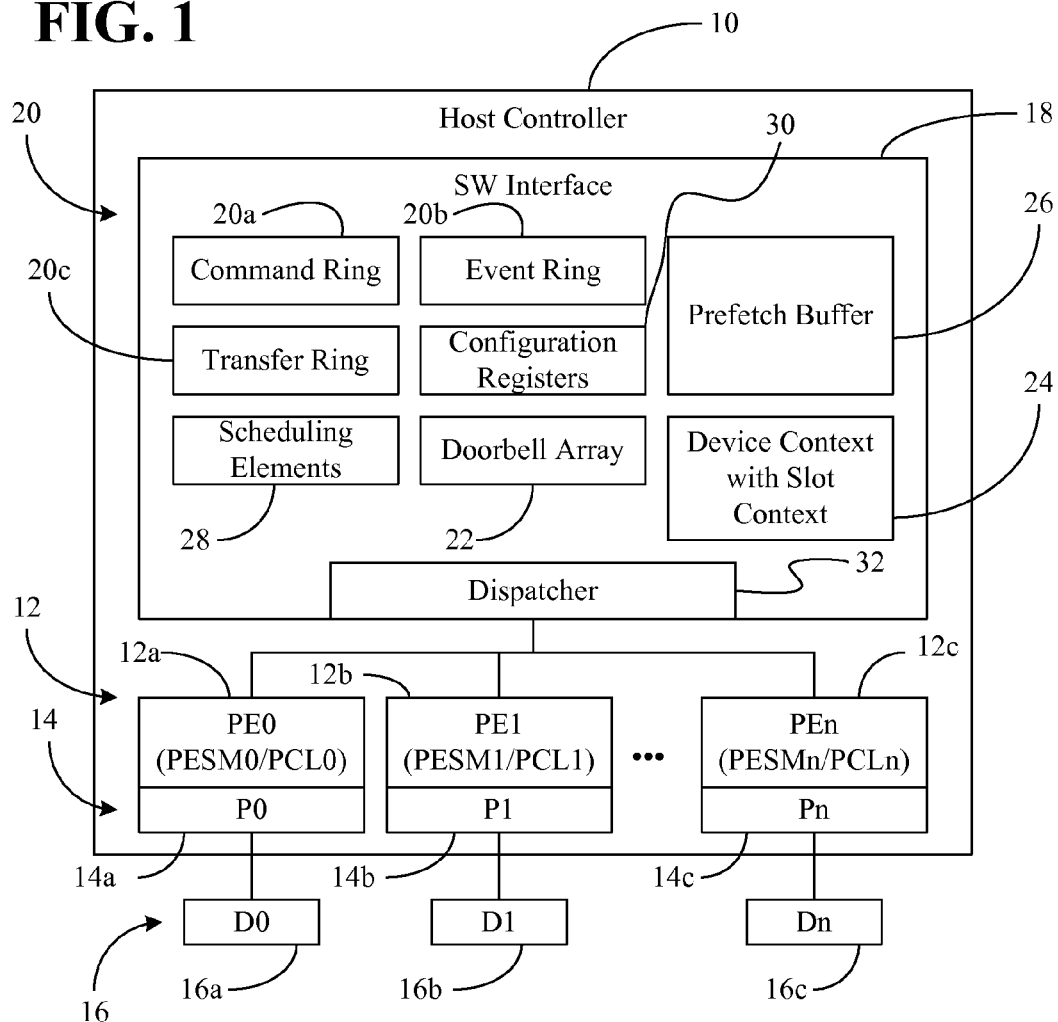
FIG. 1 is a block diagram of an example of a host controller according to an embodiment.

Embodiments may provide for a system including a plurality of protocol engines having a first protocol engine with a dedicated first port. The first protocol engine can determine a first speed of a device in response to a coupling of the device to the first port, and transfer data at the first speed between the first protocol engine and the device via the first port. The system may also include software interface logic to transfer data at a second speed between the software interface logic and the first protocol engine, wherein the second speed is greater than the first speed. The data can be transferred between the software interface logic and the first protocol engine in a transaction in which no split tokens are exchanged.

Other embodiments can include a computer readable storage medium having a set of stored instructions which, if executed by a processor, cause a computer to determine a first speed of a device at a first protocol engine having a dedicated first port in response to a coupling of the device to the first port. The instructions may also be executed to transfer data at a second speed between software interface logic and the first protocol engine, and transfer data at the first speed between the first protocol engine and the device via the first port, wherein the second speed is greater than the first speed. The data can be transferred between the software interface logic and the first protocol engine in a transaction in which no split tokens are exchanged.

Embodiments may also provide for a method in which a first speed of a device is determined at a first protocol engine having a dedicated first port in response to a coupling of the device to the first port. A software notification can be received at software interface logic, wherein the notification includes a device context having a slot context and a transfer descriptor. The slot context may include a port number corresponding to the first port and the transfer descriptor can include data transfer information. The method may also provide for fetching data based on the data transfer information, and selecting the first protocol engine from a plurality of protocol engines based on the port number. A data transfer request and the fetched data can be dispatched at a second speed from a dispatcher module of the software interface logic to the first protocol engine, wherein the second speed is greater than the first speed. In addition, a state machine of the first protocol engine can be used to form a packet based on the transfer request and the fetched data from the dispatcher module. The packet may be output from the state machine and received at port control logic of the first protocol engine, wherein the port control logic has multi-speed functionality. The method can also provide for transmitting at the first speed the packet from the port control logic to the device via the first port, and transmitting an acknowledgement from the first protocol engine to the software interface logic in response to receiving an acknowledgement from the device.

Turning now to FIG. 1, a root hub host controller 10 is shown. The illustrated host controller 10 has software (e.g., device driver) interface logic 18 and a plurality of protocol engines 12 (12a-12c), wherein each protocol engine ("PE") has a dedicated port ("P") 14 (14a-14c) and the ports 14 are integrated into the host controller 10. One or more devices ("D") 16 (16a-16c) such as keyboards, digital cameras, mice, etc., may be coupled to the ports 14 in order to communicate with a computing system (not shown) containing the host controller 10. In one example, one or more of the devices 16 has a maximum operating speed that is less than the operating speed of the host controller 10. For example, the host controller 10 might operate at a speed of 5 Giga bit per second, wherein one or more of the devices 16 is classified as a full speed (FS) or a low speed (LS) device (e.g., having speeds of 12 Mega bit per second and 1.5 Mega bit per second, respectively).

Rather than employing an actual transaction translator (TT) component, which might require split tokens from software interface logic in order to identify speed mismatches and to establish the appropriate communication speeds, the ports 14 use the dedicated protocol engines 12 to determine and control the speed at which transactions are sent between the host controller 10 and the devices 16. In particular, each illustrated protocol engine 12 can determine the speed of a device 16 upon connection of the device 16 to a port 14 prior to receipt of any notice, notification or token from the software interface logic 18. Moreover, each protocol engine 12 can have a protocol engine state machine ("PESM") and port control logic ("PCL"), wherein the state machines can process packets to be exchanged between the host controller 10 and the devices 16, and the port control logic can have multi-speed (e.g., high speed, full speed, low speed) functionality. Thus, the protocol engines 12 might be collectively considered a "virtual transaction translator" having enhanced bandwidth capability, less power consumption, and smaller real estate requirements. In addition, by dedicating each protocol engine 12 to a port 14, the illustrated approach also eliminates any need of the software interface logic 18 to broadcast transactions to multiple ports 14. Accordingly, concurrent transfer of data between the host controller 10 and multiple devices 16 can be achieved.

The software interface logic 18 can have ring (e.g., notification) components 20 (20a-20c), which enable the software running on the computing system to alert the software interface logic 18 of commands, events, transfers, etc. via a doorbell array 22. A given software notification might identify a device context 24 having a slot context and a transfer descriptor, wherein the slot context can include a root hub port number corresponding to the port connected to the device in question and the transfer descriptor includes other memory-related data transfer information. The illustrated software interface logic 18 also includes control components such as scheduling elements 28 and configuration registers 30, and a prefetch buffer 26 to hold device contexts 24 and data for transfer. A dispatcher module 32 can fetch data from the prefetch buffer 26 based on the data transfer information in the transfer descriptors, select protocol engines based on the root hub port numbers in the slot contexts, and dispatch data transfer requests and fetched data to the protocol engines 12 at the speed of the host controller 10.

Figure 2:
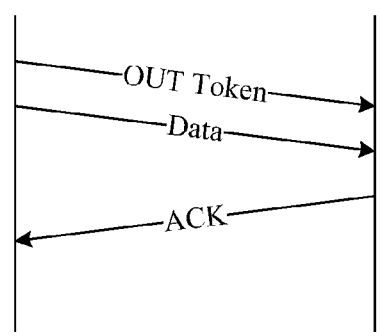
FIG. 2 is a timing diagram of an example of an OUT transaction according to an embodiment.

FIG. 2 demonstrates in timing diagram 34 that the approaches described herein enable data to be transferred in transactions in which no split tokens are exchanged. In particular, a host controller with a "virtual TT" conducts an OUT transaction by issuing an OUT token and associated data to a target device without the need for the exchange of a SSplit token. Upon confirming successful receipt of the data, the target device can return an acknowledgement ("ACK") packet to the host controller, wherein the host controller may notify the appropriate software without the need for the exchange of a CSplit token. The elimination of split tokens can provide more bandwidth for other transactions and/or a reduction in power consumption. Such advantages may be obtained for a wide variety of transactions such as IN transactions, setup transactions, and so on.

Figure 3:
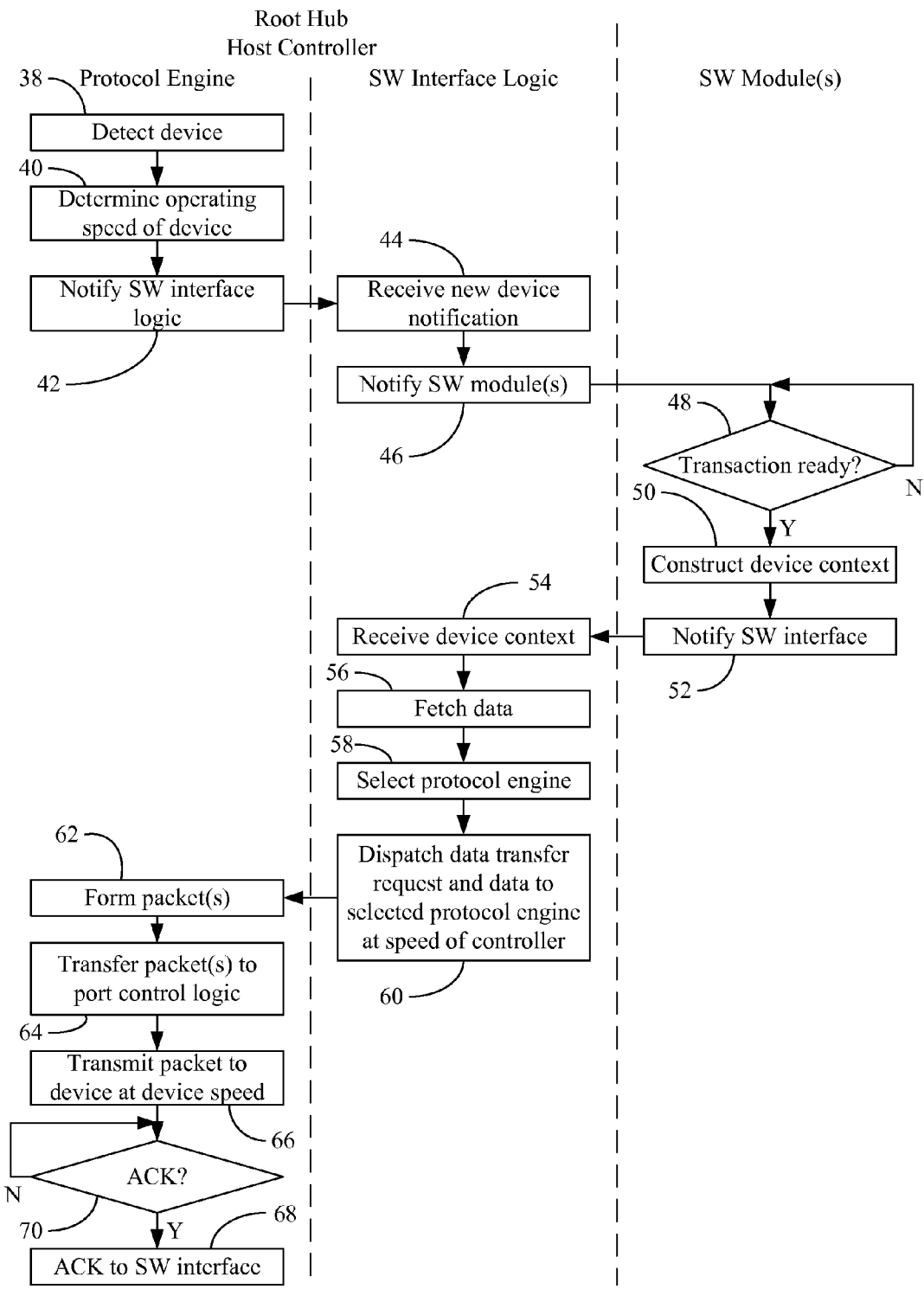
FIG. 3 is a flowchart of an example of a method of conducting a transaction according to an embodiment.

Turning now to FIG. 3, a method 36 of conducting a transaction such as an OUT, IN or setup transaction, is shown. The method 36 may be implemented in fixed-functionality hardware using circuit technology such as application specific integrated circuit (ASIC), complementary metal oxide semiconductor (CMOS) or transistor-transistor logic (TTL) technology, in executable firmware as a set of logic instructions stored in a machine- or computer-readable medium of a memory such as random access memory (RAM), read only memory (ROM), programmable ROM (PROM), flash memory, etc., or any combination thereof. Processing block 38 provides for detecting a coupling of a device to a port of a root hub host controller at a protocol engine dedicated to the port. The protocol engine may determine the speed of the newly connected device at block 40, wherein the device might be a FS or LS device. Thus, the protocol engine can be aware of the device speed prior to receipt of any notice, notification or token from the software interface logic. Block 42 provides for notifying software interface logic of the host controller that the device has been connected.

Upon receiving the new device notification at block 44, the software interface logic can notify the appropriate software (e.g., device driver) module at block 46. Block 48 provides for determining whether a transaction exists at the software module. While in the illustrated example, the transaction may likely be a setup transaction, block 48 can check for other transactions such as OUT transactions, IN transactions, etc. The software module may construct a device context at block 50, wherein the device context identifies a slot context and a transfer descriptor ("TD"). In one example, the slot context includes a root hub port number corresponding to the port to which the protocol engine is coupled, and the transfer descriptor includes data transfer information. Block 52 provides for notifying the software interface logic by ringing the doorbell to the host controller.

The software interface logic can receive the device context information at block 54, wherein the dispatcher module of the software interface logic may fetch the corresponding device context into the local buffer if the device context is not already there. Block 56 provides for fetching the data based on the TD information. The dispatcher module can use the root hub port number to select the proper protocol engine at block 58, and dispatch a data transfer request and the fetched data to the selected protocol engine at block 60. The dispatching process may be conducted at the speed of the host controller and can involve a unicast transmission only to the selected protocol engine. Accordingly, data could be transferred between the software interface logic and another protocol engine having a dedicated port connected to a device, wherein the data is transferred between the other protocol engine and its device concurrently with the transfer of data in the illustrated example.

Block 62 provides for using a state machine of the protocol engine to form one or more packets, including headers and payload, based on the transfer request and the data from the dispatcher module. The state machine can transfer the packet(s) to the port control logic of the protocol engine at block 64, wherein the packet(s) may be transmitted to the device via the port corresponding to the protocol engine at block 66, at the appropriate device speed. An acknowledgement can be sent to the software interface at block 68 in response to receiving an acknowledgement from the device at block 70. In particular, the packet(s) of block 66 can be transmitted to the device without the issuance of a SSplit token, and the acknowledgement of block 68 can be issued without any requirement of a C Split token. The acknowledgement may be forwarded to the software module via the software interface logic to complete the transaction detected at block 48.

Figure 4:
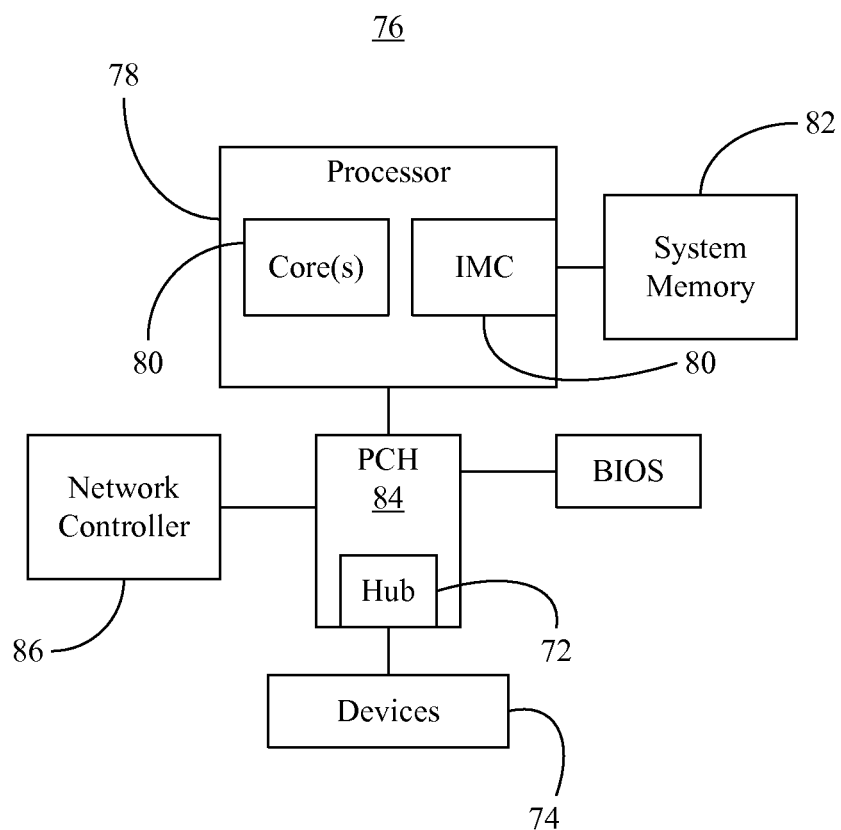
FIG. 4 is a block diagram of an example of a system according to an embodiment.

FIG. 4 shows a computing system 76. The system 76 could be part of a mobile device such as a laptop, personal digital assistant (PDA), mobile Internet device (MID), wireless smart phone, media player, imaging device, etc., or any combination thereof The system 76 could alternatively include a fixed platform such as a desktop personal computer (PC) or a server. In the illustrated example, a processor 78 includes one or more cores 80 and an integrated memory controller (IMC) 80, which provides access to system memory 82. The system memory 82 could include dual data rate (DDR) synchronous dynamic random access memory (SDRAM, e.g., DDR3 SDRAM JEDEC Standard JESD79-3C, April 2008) modules. The modules of the system memory 82 may be incorporated into a single inline memory module (SIMM), dual inline memory module (DIMM), small outline DIMM (SODIMM), and so on. The processor 78 may also execute one or more drivers and an operating system (OS) 18 such as a Microsoft Windows, Linux, or Mac (Macintosh) OS.

The illustrated processor 78 communicates with a platform controller hub (PCH) 84, also known as a Southbridge, via a bus. The IMC 80/processor 78 and the PCH 84 are sometimes referred to as a chipset. The processor 78 may also be operatively connected to a network (not shown) through the PCH 84 and a network controller 86. Thus, the network controller 86 could provide off-platform communication functionality for a wide variety of purposes such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes.

The PCH 84 may also have internal controllers such as a USB root hub controller 72, a Serial ATA (SATA, e.g., SATA Rev. 3.0 Specification, May 27, 2009, SATA International Organization/SATA-IO) controller, a High Definition Audio controller, etc. The illustrated PCH 84 may also be coupled to one or more devices 74, which may include FS and LS user interface (UI) devices (e.g., joystick, keyboard, mouse, etc.) that enable a user to interact with and perceive information from the system 76, and to storage, which can include a hard drive, read only memory (ROM), optical disk, flash memory (not shown), etc.

As already noted, the controller 72 can include a plurality of protocol engines having a first protocol engine with a dedicated first port, wherein the first protocol engine determines a first speed of a device in response to a coupling of the device to the first port. The first protocol engine may also transfer data between the first protocol engine and the device at the first speed via the first port. The controller 72 can also include software interface logic to transfer data between the software interface logic and the first protocol engine at a second speed, wherein the second speed is greater than the first speed. The plurality of protocol engines may also include a second protocol engine with a dedicated second port coupled to another device, wherein the software interface logic transfers data between the software interface logic and the second protocol engine at the second speed. The first and second protocol engines can exchange data with their respective devices concurrently and in transactions in which no split tokens are exchanged.

Thus, the above-described techniques enable host controllers to send transactions to a USB device through its root hub ports natively and can therefore eliminate the Split Protocol (Start Split and Complete Split transactions) with comparable scalability and expandability. The host controllers may also send different transactions to different ports in their detected USB speed. Such a solution can eliminate the broadcasting of packets to downstream ports and may improve overall USB system performance as the host controller can process multiple transactions concurrently.

Embodiments of the present invention are applicable for use with all types of semiconductor integrated circuit ("IC") chips. Examples of these IC chips include but are not limited to processors, controllers, chipset components, programmable logic arrays (PLA), memory chips, network chips, systems on chip (SoCs), SSD/NAND controller ASICs, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
   determining a first speed of a device at a first protocol engine having a dedicated first port in response to a coupling of the device to the first port;
   receiving a software notification at software interface logic, the notification including a device context having a slot context and a transfer descriptor, wherein the slot context includes a port number corresponding to the first port and the transfer descriptor includes data transfer information;

fetching data based on the data transfer information;
selecting the first protocol engine from a plurality of protocol engines based on the port number;
dispatching a data transfer request and the fetched data at a second speed from a dispatcher module of the software interface logic to the first protocol engine, wherein the second speed is greater than the first speed;
using a state machine of the first protocol engine to form a packet based on the transfer request and the fetched data from the dispatcher module;
outputting the packet from the state machine;
receiving the packet at port control logic of the first protocol engine, wherein the port control logic has multi-speed functionality;
transmitting at the first speed the packet from the port control logic to the device via the first port; and
transmitting an acknowledgement from the first protocol engine to the software interface logic in response to receiving an acknowledgement from the device.

2. The method of claim 1, wherein data is transferred between the software interface logic and the first protocol engine in a unicast OUT transaction in which no split tokens are exchanged.

3. The method of claim 1, further including:
transferring data between the software interface logic and a second protocol engine at the second speed, wherein the second protocol engine has a dedicated second port; and
transferring data between the second protocol engine and a device coupled to the second port concurrently with the transfer of data between the first protocol engine and the device coupled to the first port.

4. The method of claim 3, wherein data is transferred between the first and second protocol engines and first and second Universal Serial Bus (USB) ports, respectively.

5. A system comprising:
a plurality of protocol engines having a first protocol engine with a dedicated first port, the first protocol engine to determine a first speed of a device in response to a coupling of the device to the first port, and to transfer data at the first speed between the first protocol engine and the device via the first port; and
software interface logic to transfer data at a second speed between the software interface logic and the first protocol engine, wherein the second speed is to be greater than the first speed; and
wherein data is to be transferred between the software interface logic and the first protocol engine in a transaction in which no split tokens are exchanged.

6. The system of claim 5, wherein the transaction is to include at least one of a unicast OUT transaction, an IN transaction, and a setup transaction.

7. The system of claim 6, wherein the transaction is to include the unicast OUT transaction and the software interface logic is to receive a software notification including a device context having a slot context and a transfer descriptor, wherein the slot context is to include a port number corresponding to the first port and the transfer descriptor is to include data transfer information.

8. The system of claim 7, wherein the software interface logic includes a dispatcher module to fetch data based on the data transfer information, select the first protocol engine from the plurality of protocol engines based on the port number, and dispatch a transfer request and data to the first protocol engine.

9. The system of claim 8, wherein the first protocol engine includes:
a state machine to form a packet based on the transfer request and data from the dispatcher module, and output the packet; and
port control logic having multi-speed functionality, the port control logic to receive the packet from the state machine and transmit the packet to the device at the first speed, wherein the first protocol engine is to transmit an acknowledgement to the software interface logic in response to receiving an acknowledgement from the device.

10. The system of claim 5, wherein the plurality of protocol engines further includes a second protocol engine with a dedicated second port to be coupled to a device, the software interface logic is to further transfer data between the software interface logic and the second protocol engine at the second speed, and the first and second protocol engines are to exchange data with their respective devices concurrently.

11. The system of claim 10, wherein the first and second ports include Universal Serial Bus (USB) ports.

12. A computer readable storage medium comprising a set of stored instructions which, if executed by a processor, cause a computer to:
determine a first speed of a device at a first protocol engine having a dedicated first port in response to a coupling of the device to the first port;
transfer data at a second speed between software interface logic and the first protocol engine; and
transfer data at the first speed between the first protocol engine and the device via the first port, wherein the second speed is to be greater than the first speed; and
wherein data is to be transferred between the software interface logic and the first protocol engine in a transaction in which no split tokens are exchanged.

13. The medium of claim 12, wherein the transaction is to include at least one of a unicast OUT transaction, an IN transaction, and a setup transaction.

14. The medium of claim 13, wherein the transaction is to include the unicast OUT transaction and the software interface logic is to receive a software notification including a device context having a slot context and a transfer descriptor, wherein the slot context is to include a port number corresponding to the first port and the transfer descriptor is to include data transfer information.

15. The medium of claim 14, wherein the software interface logic includes a dispatcher module to fetch data based on the data transfer information, select the first protocol engine from a plurality of protocol engines based on the port number, and dispatch a transfer request and data to the first protocol engine.

16. The medium of claim 15, wherein the first protocol engine includes:
a state machine to form a packet based on the transfer request and data from the dispatcher module, and output the packet; and
port control logic having multi-speed functionality, the port control logic to receive the packet from the state machine and transmit the packet to the device at the first speed via the first port, wherein the first protocol engine is to transmit an acknowledgement to the software interface logic in response to receiving an acknowledgement from the device.

17. The medium of claim 12, wherein the instructions, if executed, further cause a computer to:
- transfer data between the software interface logic and a second protocol engine at the second speed, wherein the second protocol engine is to have a dedicated second port; and
- transfer data between the second protocol engine and a device coupled to the second port concurrently with the transfer of data between the first protocol engine and the device coupled to the first port.

18. The medium of claim 17, wherein the first and second ports are to include Universal Serial Bus (USB) ports.

* * * * *

UNITED STATES PATENT AND TRADEMARK OFFICE
CERTIFICATE OF CORRECTION

PATENT NO. : 8,539,131 B2
APPLICATION NO. : 12/888807
DATED : September 17, 2013
INVENTOR(S) : Nai-Chih Chang et al.

It is certified that error appears in the above-identified patent and that said Letters Patent is hereby corrected as shown below:

Title Page, Item (56), in column 2, under "Other Publications", line 1, delete "Nai-Chin" and insert -- Nai-Chih --, therefor.

In the Drawings

On sheet 1 of 3, in Figure 2, line 2, delete "Targct Dcvicc" and insert -- Target Device --, therefor.

On sheet 2 of 3, in Figure 3, Reference Numeral 40, line 1-2, delete "Dctcrminc opcrating spccd of dcvicc" and insert -- Determine operating speed of device --, therefor.

On sheet 2 of 3, in Figure 3, Reference Numeral 60, line 1, delete "transfcr" and insert -- transfer --, therefor.

On sheet 2 of 3, in Figure 3, Reference Numeral 60, line 2-3, delete "rcqucst and data to sclcctcd protocol cnginc" and insert -- request and data to selected protocol engine --, therefor.

On sheet 2 of 3, in Figure 3, Reference Numeral 62, line 1, delete "packct" and insert -- packet --, therefor.

On sheet 2 of 3, in Figure 3, Reference Numeral 68, line 1, delete "intcrfacc" and insert -- interface --, therefor.

Signed and Sealed this
Twenty-fourth Day of December, 2013

Margaret A. Focarino
*Commissioner for Patents of the United States Patent and Trademark Office*